(12) United States Patent
Ohmi et al.

(10) Patent No.: US 7,669,455 B2
(45) Date of Patent: Mar. 2, 2010

(54) AUTOMATIC ZERO POINT CORRECTION DEVICE FOR A PRESSURE SENSOR, A PRESSURE CONTROL DEVICE AND A PRESSURE TYPE FLOW RATE CONTROL DEVICE

(75) Inventors: Tadahiro Ohmi, 1-17-301, Komegahukuro 2-chome, Aoba-ku, Sendai-shi, Miyagi 9800813 (JP); Kazuhiko Sugiyama, Nirasaki (JP); Shoichi Hino, Tokyo (JP); Eiji Takahashi, Tokyo (JP); Makoto Saegusa, Tokyo (JP); Nobukazu Ikeda, Osaka (JP); Kouji Nishino, Osaka (JP); Ryousuke Dohi, Osaka (JP); Toyomi Uenoyama, Osaka (JP); Katsuyuki Sugita, Osaka (JP)

(73) Assignees: Fujikin Incorporated, Osaka (JP); Tadahiro Ohmi, Osaka (JP)

( * ) Notice: Subject to any disclaimer, the term of this patent is extended or adjusted under 35 U.S.C. 154(b) by 545 days.

(21) Appl. No.: 10/561,602
(22) PCT Filed: Jun. 10, 2004
(86) PCT No.: PCT/JP2004/008118
§ 371 (c)(1), (2), (4) Date: Mar. 6, 2007
(87) PCT Pub. No.: WO2004/113860
PCT Pub. Date: Dec. 29, 2004

(65) Prior Publication Data
US 2007/0151321 A1    Jul. 5, 2007

(30) Foreign Application Priority Data
Jun. 20, 2003    (JP) .............................. 2003-177135

(51) Int. Cl.
*G01F 19/00*    (2006.01)
(52) U.S. Cl. ...................................... 73/1.62
(58) Field of Classification Search .............. None
See application file for complete search history.

(56) References Cited

U.S. PATENT DOCUMENTS

| | | | |
|---|---|---|---|
| 5,146,941 A * | 9/1992 | Statler | 137/8 |
| 6,571,599 B1 * | 6/2003 | Surjadi et al. | 73/1.62 |
| 6,619,141 B2 * | 9/2003 | Danninger | 73/861.63 |
| 7,025,718 B2 * | 4/2006 | Williams | 600/18 |

FOREIGN PATENT DOCUMENTS

| | | |
|---|---|---|
| JP | 08338546 A | 12/1996 |
| JP | 10082707 A | 3/1998 |
| JP | 2002-538419 A | 11/2002 |
| JP | 2003-194648 | 7/2003 |
| JP | 2003-194648 A | 7/2003 |

OTHER PUBLICATIONS

JP 2003-194648, Tokyo Electron Ltd, Patent Abstract Japan, 2 pages, Jul. 9, 2003.*
JP 08338546, Fujikin:KK, Patent Abstracts of Japan, 3 pages, Dec. 24, 1996.*
JP 10082707, OMI Tadahiro; Fujikin:KK, Patent Abstracts of Japan, 3 pages, Mar. 31, 1998.*

* cited by examiner

*Primary Examiner*—Robert R Raevis
(74) *Attorney, Agent, or Firm*—Griffin & Szipl, P.C.

(57) ABSTRACT

The invention provides an automatic zero point correction device that includes a pressure sensor, wherein output from the sensor is outputted and the sensor output is inputted to a time-varying zero point drift correction means of the sensor; a sensor output judgement means of the time-varying zero point drift correction means, wherein the sensor output judgement means operates to make a judgement determining whether the sensor output is larger than a set value; and operating condition judgement means of the time-varying zero point drift correction means, wherein the operating condition judgement means judges operating conditions of the sensor, wherein the time-varying zero point drift correction means operates to cancel time-varying zero point drift of the sensor when the sensor output judgement means determines sensor output is larger than the set value and the operating condition judgement means determines operating conditions of the sensor are within previously set operating conditions.

17 Claims, 8 Drawing Sheets

Zero point change volume for 5 hours at the vacuum⇔0.1MPaG cycle test

Zero point change volume fro 5 hours at the 0.1Mpa maintaining test $P_{1m} = 3.0 [10^2 \text{kPaA}]$
$v_0 = -2.0 [\text{mV}]$
$v_1 = 40.8 [\text{mV}]$
$V_m = 5.0 [\text{V}]$
$M = 117$
$V_m = M(v_1 - v_0)$
$V = M(v - v_0)$

PRIOR ART

PRIOR ART

US 7,669,455 B2

AUTOMATIC ZERO POINT CORRECTION DEVICE FOR A PRESSURE SENSOR, A PRESSURE CONTROL DEVICE AND A PRESSURE TYPE FLOW RATE CONTROL DEVICE

This is a National Phase Application in the United States of International Patent Application No. PCT/JP2004/008118 filed Jun. 10, 2004, which claims priority on Japanese Patent Application No. 2003-177135, filed Jun. 20, 2003. The entire disclosures of the above patent applications are hereby incorporated by reference.

FIELD OF THE INVENTION

The present invention is concerned with a pressure sensor, a pressure control device and a pressure type flow rate control device to be employed mainly in semiconductor manufacturing facilities, chemical plants and the like, and also concerned with an automatic zero point correction device for the pressure sensor, the pressure control device and the pressure type flow rate control device which has made it possible that the occurrence of measurement errors on the pressure and flow rate due over-time to changes of pressure detection values is prevented by performing an automatic zero point correction in the event that a volume of the change (a drift volume) in the output exceeds the prescribed set value at the time when the output of a pressure sensor to measure fluid pressure changes over time.

BACKGROUND OF THE INVENTION

With semiconductor manufacturing facilities and chemical products manufacturing facilities, it is required that the flow rate and pressure of raw gases to be supplied are controlled with the high degree of accuracy. To meet the needs, various types of pressure control devices, flow rate control devices and pressure sensors to be employed for these devices have been developed.

FIG. 13 and FIG. 14 illustrate one example of the conventional flow rate control device. With FIG. 13 (the U.S. Pat. No. 5,146,941), gas pressure $P_1$ on the upstream side from the orifice F and differential pressure $\delta P$ between the inlet side of the orifice F and the throat part are inputted to a computing means C, and the gas flow rate on the downstream side from the orifice is controlled to be the set flow rate by the open/close control of a control valve V through a valve controller VC based on the flow rate Wg computed with the computing means and the set flow rate Wr. This is what is known as a so-called differential pressure type flow rate control device Similarly, FIG. 14 (TOKU-KAI-HEI No. 8-338546) illustrates another example of the conventional pressure type flow rate control device. This is what is publicly known as a pressure type flow rate control device to be used under critical conditions ($P_2/P_1 \leq$ approx. 0.5), wherein the gas flow rate on the downstream side from the orifice under critical conditions is computed as $Qc=KP_1$ (where P is the pressure on the upstream side from the orifice) by the computing means C, and the control valve V is controlled by the open/close control to make smaller the difference between the set flow rate Qs and the afore-mentioned computed flow rate Qc, thus the gas flow rate on the downstream side from the orifice F is controlled to be the set value.

With the flow rate control device and the like as described above, it is needed that the gas pressure $P_1$ and the like on the upstream side from the orifice are detected. To detect the pressure, the pressure sensor for which semiconductor pressure sensitive elements such as a strain gauge and the like are used are widely utilized.

It has been known that, with the afore-mentioned pressure sensor to detect the fluid pressure $P_1$, the output values change depending on the environmental conditions surrounding the sensor, for example, such as gas temperature and the like. That is, a pressure sensor placed in the same fluid pressure might have a different output value due to the changes in fluid temperature.

For example, with the afore-mentioned strain gauge type pressure sensor, pressure is converted to voltage, and the relation that the pressure on the horizontal axis corresponds with the output voltage on the vertical axis on the graph is established. And, the output characteristics that the output voltage reaches zero when the absolute pressure is zero, and the output voltage increases linearly along with the increase of the absolute pressure are desired.

However, it has been known that, with actual pressure sensors in practice, the sensor output changes even under the same gas pressure when gas temperature changes as described above, and that characteristics of pressure to output have no direct relation to each other in a strict sense.

Specifically, when the pressure applied to the pressure sensor is zero, the sensor output is called a zero point output, while when the zero point changes with temperature changes, it is called a temperature drift of the zero point output, and temperature changes of the sensor output at the time of applying pressure is called a temperature drift of the span output. Adjustments on both the temperature drift of the zero point output and the temperature drift of the span output are needed to obtain an accurate sensor output.

Let's assume, for example, that the zero point voltage is 0(V) without the temperature drift of the zero point output of the pressure sensor, and that the output voltage of the pressure sensor is 20 mV when the absolute pressure of $1.0(\times 10^2$ kPaA) or the gas pressure of 1 at m is applied to the pressure sensor. When the gas temperature changes under this state, it is anticipated that the output voltage changes from 20 mV. As described above, the change is what is called the temperature drift of the span output. In fact, because of the temperature drift of the zero point output, what changed with the zero point voltage (the zero point output drift) are added to the temperature drift of the span output with any given pressure.

As explained above, with the pressure type flow rate control device and the like, while measuring the upstream side pressure $P_1$ and/or the downstream side pressure $P_2$, a flow rate is controlled when passing through an orifice, there are included errors with the pressure P1, P2 when the output voltage is directly converted to pressure due to the reason that the temperature change characteristics which are a temperature drift of the zero point output and the temperature drift of the span output are included in the output voltage of the pressure sensor.

For this reason, inventors of the present invention have developed system technologies which allow more accurate fluid pressure control, pressure control and flow rate control by automatically correcting the temperature drift of the zero point output and/or the temperature drift of the span output of the pressure sensor caused by the afore-mentioned temperature changes with the control circuits or control software, and made them public in TOKU-GAN No. 2001-399910.

Techniques pertaining to the afore-mentioned TOKU-GAN No. 2001-399910 make it possible to almost completely eliminate control errors on the pressure, flow rate or the like arising from such a temperature drift of the pressure sensor by employing a comparatively simply constituted device, and thereby achieve excellent, practical effects.

However, it has been recently learned that there exist not only the output voltage changes caused by the afore-mentioned fluid temperature, but also the output voltage changes over time with a pressure sensor, particularly with the pressure sensor which employs a semiconductor pressure sensitive element.

The afore-mentioned changes of the output voltage of the pressure sensor over time have become more noticeable when it is used in a state of low pressure (for example, in a vacuum of $10^{-4} \sim 10^{-6}$ Torr to approx. 100 Torr) on the secondary side from the orifice F. Therefore, its influence has not been overlooked on the pressure type flow rate control device that is used for the device to supply various gases to the process chamber in semiconductor manufacturing facilities.

On the other hand, to eliminate effects due to the afore-mentioned output changes of the pressure sensor over time, it may be possible to formulate a measure wherein characteristics of pressure to output of the pressure sensor are varied for a prescribed volume by installing an additional control circuit or control software. However, this measure creates a problem because the additional installation of the device to correct these output changes over time (hereinafter called a "time-varying output drift of the pressure sensor") invites a rise in manufacturing costs of a pressure control device or a flow rate control device.

Patent Literature 1: U.S. Pat. No. 5,146,941

Patent Literature 2: TOKU-KAI-HEI No. 8-338546 Public Bulletin

Patent Literature 3: TOKU-KAI-HEI No. 10-82707 Public Bulletin

DISCLOSURE OF THE INVENTION

Object of the Invention

It is an object of the present invention to solve the afore-mentioned problems with the conventional pressure sensor for which a semiconductor pressure sensitive element is employed or the flow rate/pressure control device for which the pressure sensor is used, namely, (1) that control accuracy of the flow rate, pressure and the like are deteriorated due to changes of the pressure-output characteristics of the pressure sensor over time, and (2) that an additional installation of the device to correct the afore-mentioned time-varying output drift invites a rise in manufacturing costs of the pressure control device, a flow rate control device and the like. In accordance with the present invention, another object is to provide an automatic zero point adjustment device for a pressure sensor, a pressure control device and a pressure type flow rate control device that makes it possible for the time-varying zero point drift of the pressure sensor to be simply and accurately corrected without inviting a substantial rise in production costs by making effective use of a temperature drift correction means for correcting pressure-output characteristics of the pressure sensor equipped with the flow rate/pressure control device.

Means to Achieve the Object

Inventors of the present invention repeated various kinds of tests as shown below using not only a pressure sensor but also a pressure control device and a pressure type flow rate control device for which the sensor is employed to analyze pressure-output changes of the pressure sensor over time.

With these test results, it has been learned that, for a pressure sensor that employs a semiconductor pressure sensitive element, (1) the zero point of the pressure sensor changes over time, (2) changes of the zero point over time shift toward the minus side without exception when used under vacuum (that is, the output value under pressure zero in the pressure-output characteristics shifts toward the minus side), and (3) the zero point of the pressure sensor shifts toward the minus side, and errors of pressure control accuracy shift toward the plus side for what shifted toward the minus side (that is, if the output value shifts from the zero point toward the minus side under pressure zero, for example, toward the minus side by voltage Δv equivalent to 0.2% of the full scale output voltage, errors of pressure control accuracy increase by voltage Δv equivalent to 0.2% of the full scale output voltage).

The present invention has been created based on the knowledge obtained from what the inventors have learned as discussed above. The present invention, in accordance with a first embodiment, is fundamentally constituted with a pressure sensor to measure fluid pressure, the output voltage from the pressure sensor is outputted to the outside, the afore-mentioned sensor output voltage is inputted to the time-varying zero point drift correction means of the pressure sensor, a judgment is made to determine if the afore-mentioned sensor output voltage is larger than the set value with the sensor output judgment means of the time-varying zero point drift correction means, and further the operating conditions of the pressure sensor are judged with the afore-mentioned operating condition judgment means of the time-varying zero point drift correction means, the time-varying zero point drift of the pressure sensor is cancelled when it is found that the afore-mentioned sensor output voltage is larger than the set value and the operating conditions of the pressure sensor are under the operating conditions previously set.

The present invention, in accordance with a second embodiment that further modifies the first embodiment, is fundamentally constituted such that a semiconductor pressure sensitive element is employed as the pressure sensor, the output voltage from the pressure sensor is outputted to the outside through the amplifier and is inputted to the time-varying zero point drift correction means of the pressure sensor through an A/D converter, and further the output for the zero point correction, which is identical to the afore-mentioned sensor output voltage and with reversed polarity, is inputted to the offset terminal of the afore-mentioned amplifier from the afore-mentioned time-varying zero point drift correction means through the D/A converter when the sensor output voltage is larger than the set value and the pressure sensor is under the set operating conditions.

The present invention, in accordance with a third embodiment, is fundamentally constituted with a pressure control device equipped with a control valve for pressure control and a pressure sensor to measure fluid pressure, the output voltage from the pressure sensor is outputted to the outside, the afore-mentioned sensor output voltage is inputted to the time-varying zero point drift correction means of the pressure sensor, a judgment is made to determine if the afore-mentioned sensor output voltage is larger than the set value with the said sensor output judgment means of the time-varying zero point drift correction means, and further the operating conditions of the pressure sensor are judged with the afore-mentioned operating condition judgment means of the time-varying zero point correction means, the time-varying zero point drift of the pressure sensor is cancelled when it is found that the afore-mentioned sensor output voltage is larger than the set value and the operating conditions of the pressure sensor are under the operating conditions previously set.

The present invention, in accordance with a fourth embodiment that further modifies the third embodiment, is fundamentally constituted such that a semiconductor pressure sensitive element is employed as the pressure sensor, the output voltage from the pressure sensor is outputted to the outside through the amplifier and is inputted to the time-varying zero point drift correction means of the pressure sensor through an A/D converter, and further the output for the zero point correction, which is identical to the afore-mentioned sensor output voltage and with reversed polarity, is inputted to the offset terminal of the afore-mentioned amplifier from the afore-mentioned time-varying zero point drift correction means through the D/A converter when the sensor output voltage is larger than the set value and the pressure sensor is under the set operating conditions.

The present invention, in accordance with a fifth embodiment, is fundamentally constituted with a pressure type flow rate control device comprising an orifice for the flow rate control, a control valve mounted on the upstream side pipe from the orifice, and an upstream side pressure sensor installed between the orifice and the control valve to detect upstream side pressure $P_1$ to control the flow rate of fluid passing through the orifice by the upstream side pressure $P_1$, the afore-mentioned output voltage from the pressure sensor is outputted to the flow rate computing means, the afore-mentioned sensor output voltage is inputted to the time-varying zero point drift correction means of the pressure sensor, a judgment is made to determine if the afore-mentioned sensor output voltage is larger than the set value with the sensor output judgment means of the time-varying zero point drift correction means, and further the operating conditions of the pressure sensor are judged with the afore-mentioned operating condition judgment means of the time-varying zero point correction means, the time-varying zero point drift of the pressure sensor is cancelled when it is found that the afore-mentioned sensor output voltage is larger than the set value and the operating conditions of the pressure sensor are under the operating conditions previously set.

The present invention, in accordance with a sixth embodiment that further modifies the fifth embodiment, is fundamentally constituted such that a semiconductor pressure sensitive element is employed as the pressure sensor, the output voltage from the pressure sensor is outputted to the outside through the amplifier and is inputted to the time-varying zero point drift correction means of the pressure sensor through an A/D converter, and further the output for the zero point correction, which is identical to the afore-mentioned sensor output voltage and with revered polarity, is inputted to the offset terminal of the afore-mentioned amplifier from the afore-mentioned time-varying zero point drift correction means through the D/A converter when the sensor output voltage is larger than the set value and the pressure sensor is under the set operating conditions.

The present invention, in accordance with a seventh embodiment, is fundamentally constituted with a pressure type flow rate control device comprising an orifice for the flow rate control, a control valve mounted on the upstream side pipe from the orifice, an upstream side pressure sensor installed between the orifice and the control valve to detect upstream side pressure $P_1$, and a downstream side pressure sensor mounted on the downstream side pipe to detect downstream side pressure $P_2$ to control the flow rate of fluid passing through the orifice by both upstream side pressure $P_1$ and downstream side pressure $P_2$, the output voltage from the pressure sensor is outputted to the flow rate computing means, the afore-mentioned sensor output voltage is inputted to the time-varying zero point drift correction means of the pressure sensor, a judgment is made to determine if the afore-mentioned sensor output voltage is larger than the set value with the said sensor output judgment means of the time-varying zero-point drift correction means, and further the operating conditions of the pressure sensor are judged with the afore-mentioned operating condition judgment means, the time-varying zero point drift of the pressure sensor is canceled when it is found that the afore-mentioned sensor output voltage is larger than the set value and the operating conditions of the pressure sensor are under the operating conditions previously set.

The present invention, in accordance with an eighth embodiment, is fundamentally constituted such that a semiconductor pressure sensitive element is employed as the pressure sensor, the output voltage from the pressure sensor is outputted to the outside through the amplifier and is inputted to the time-varying zero point drift correction means of the pressure sensor through an A/D converter, and further the output for the zero point correction, which is identical to the afore-mentioned sensor output voltage and with reversed polarity, is inputted to the offset terminal of the afore-mentioned amplifier from the afore-mentioned time-varying zero-point drift correction means through the D/A converter when the sensor output voltage is larger than the set value and the pressure sensor is under the set operating conditions The present invention, in accordance with a ninth embodiment that further modifies the third and fourth embodiments, is so made that the set value, which serves as a reference at the sensor output judgment means of the time-varying zero point drift correction means of the pressure sensor, becomes the sensor output voltage equivalent to less than control accuracy of the full scale pressure FS to be detected by the pressure sensor.

The present invention, in accordance with a tenth embodiment that further modifies the third and fourth embodiments, is so made that the set operating conditions, which serve as a reference at the operating condition judgment means of the time-varying zero point drift correction means of the pressure sensor, are made up of three conditions, that is, whether or not a signal for forced opening to the control valve exists, whether or not a signal for forced closing to the control valve exists, and the set signal for the flow rate is zero.

The present invention, in accordance with an eleventh embodiment of the invention that further modifies the fifth, sixth, seventh and eighth embodiments, is made such that the set value, which serves as a reference at the sensor output judgment means of the time-varying zero point drift correction means of the pressure sensor, becomes the sensor output voltage equivalent to less than control accuracy of the full scale pressure FS to be detected by the pressure sensor.

The present invention, in accordance with a twelfth embodiment that further modifies the fifth, sixth, seventh and eighth embodiments, is made so that the set operating conditions, which serve as a reference at the operating condition judgment means of the pressure sensor, are made up of three conditions, that is, whether or not a signal for forced opening to the control valve exists, whether or not a signal for forced closing to the control valve exists, and the set value of the flow rate is zero.

The present invention, in accordance with a thirteenth embodiment that further modifies the fourth embodiment, is made such that a D/A converter, through which voltage for the zero point correction is outputted to the offset terminal of the amplifier from the time-varying zero point correction means, is shared with the temperature drift correction means of the pressure sensor mounted on the flow rate computing means of the pressure type flow rate control device.

The present invention, in accordance with a fourteenth embodiment that further modifies the sixth embodiment or the eighth embodiment, is constituted such that a D/A converter, through which voltage for the zero point correction is outputted to the offset terminal of the amplifier from the time-varying zero point drift correction means, is shared with the temperature drift correction means of the pressure sensor mounted on the flow rate computing means of the pressure type flow rate control device.

EFFECTS OF THE INVENTION

The present invention, in accordance with the first embodiment, is constituted so the zero point drift that occurs with changes over-time is cancelled based on judgment by the time-varying zero point drift correction means, thus resulting in substantial improvements in pressure detection accuracy of the pressure sensor.

The present invention, in accordance with the second embodiment, is constituted so that the zero point drift that occurs with changes over time is cancelled by inputting voltage, which is identical to the drift voltage occurred with changes over time of the pressure sensor and with reversed polarity, to the offset terminal of an amplifier for amplifying output of the pressure sensor based on the judgment by the time-varying zero point drift correction means, thus resulting in substantial improvements in pressure detection accuracy of the pressure sensor.

Also according to the third to eighth embodiments, inclusive, of the present invention, control accuracy of pressure and flow rate is remarkably improved because pressure detection accuracy of the pressure sensor, which functions as the basis of pressure control and flow rate control, is enhanced.

According to the ninth and eleventh embodiments of the present invention, an automatic zero point correction is conducted based on the sensor output voltage less than control accuracy of the full scale pressure FS to be detected by the pressure sensor, for example, that is equivalent to 0.13% of the full scale FS, thus always allowing the flow rate measurement value to be maintained within the prescribed range of accuracy.

Furthermore, according to the tenth and twelfth embodiments of the present invention, the zero point drift can be cancelled with a high degree of accuracy because the time-varying zero point drift correction is automatically performed in the event that the environmental conditions surrounding the pressure sensor on the upstream side from the orifice are in a state of near-vacuum.

According to the thirteenth and fourteenth embodiments of the present invention, a D/A converter to supply voltage for the drift correction to the offset terminal of an amplifier is made in such a manner that it is shared with the temperature drift correction means of the pressure sensor, thus allowing the constitutions of the correction means of the temperature drift and the time-varying drift of the pressure sensor for the pressure control device and the pressure type flow rate control device to be simplified. As stated above, the present invention achieves excellent, practical effects.

Figure 1:
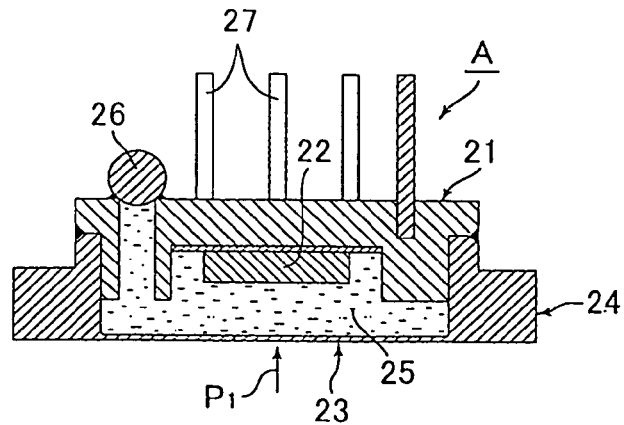
FIG. 1 is a structural drawing of a semiconductor element type pressure sensor (a pressure transducer) used for the present invention.

LIST OF REFERENCE CHARACTERS AND NUMERALS $P_1$ Gas pressure on the upstream side from the orifice
A Pressure sensor
B Pipe
1 Pressure type flow rate control device
2 Orifice
2a Orifice opening
3 Upstream side pressure sensor
4 Upstream side pipe
5 Downstream side pipe
6 Temperature sensor
7 Control circuit
7a Flow rate computing means
7b Flow rate setting means
7c Comparative means
8 Valve driving part
9 Control valve
10 Gas supply source
11 Pressure regulator
12,13 Valves
14 Process chamber
15 Vacuum pump
16 Fixed amplification circuit
16a Offset terminal
17,18 Variable amplification circuits 19 A/D converter
20 CPU
21 Sensor base
22 Sensor chip
23 Diaphragm
24 Diaphragm base
25 Silicon oil
26 Sealing body
27 Lead pin
28 Fixing body
29 Holding nut
30 Bearing
31 Seal ring
40 D/A converter for offsetting
40a,40b D/A converters
40c,40d Buffers
40e Buffer for synthesis
41 D/A converter
42,43,44 A/D converter
7a' Flow rate linearity correction part in the flow rate computing means
48 Temperature drift correction means of the pressure sensor
49 Time-varying zero point drift correction means of the pressure sensor
49a Sensor output judgment means
49b Operating condition judgment means
50 Piezo-step-up circuit

BEST MODE TO CARRY OUT THE INVENTION

Figure 2:
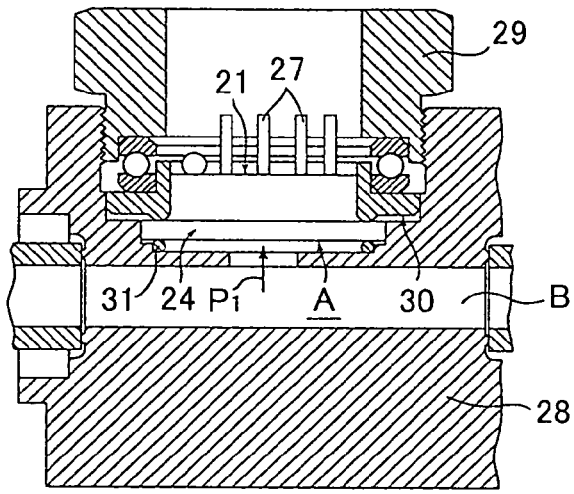
FIG. 2 is a cross-sectional view to illustrate how the pressure sensor used for the present invention is mounted.

First, inventors of the present invention conducted a survey and then measured changes over-time of pressure-output characteristics of a pressure sensor A by fixing the pressure sensor A structured as shown in FIG. 1 to a pipe B in a configuration as shown in FIG. 2, and by the inside of the pipe B being evacuated and maintaining in the prescribed degree of vacuum by use of a vacuum pump (not illustrated).

Referring to FIG. 1 and FIG. 2, 21 designates a sensor base, 22 a sensor chip (a semiconductor type pressure sensitive element), 23 a diaphragm, 24 a diaphragm base, 25 silicon oil, 26 a sealing body, 27 a lead pin, 28 a fixing body, 29 a holding nut, 30 a bearing, 31 a seal ring and $P_1$ gas pressure.

Referring to FIG. 2, a pressure sensor A is fixed to the fixing body 28 by use of the holding nut 29. However, any fixing mechanisms can be employed to fix the pressure sensor A. For example, a flange (not illustrated) for fixing can be used to fix the pressure sensor A to the fixing body 28.

Though not illustrated in FIG. 1 and FIG. 2, a pressure sensor A having a so-called strain gauge fixed to the inside surface of the diaphragm 23 and having a structure wherein silicon oil 25 is not used has been also used to replace the pressure sensor A having a structure shown in FIG. 1.

Gas pressure $P_1$ applied to a diaphragm 23 changes by decompressing the inside of the pipe B, and accordingly pressure applied to the sensor chip 22 (or a strain gauge) changes, thus resulting in changes in the output voltage from the sensor chip 22, and changes in gas pressure $P_1$ is detected. Because the pressure sensor A itself is publicly disclosed (the TOKU-KAI-HEI No. 10-82707 and others), the explanation is omitted herewith.

Figure 3:
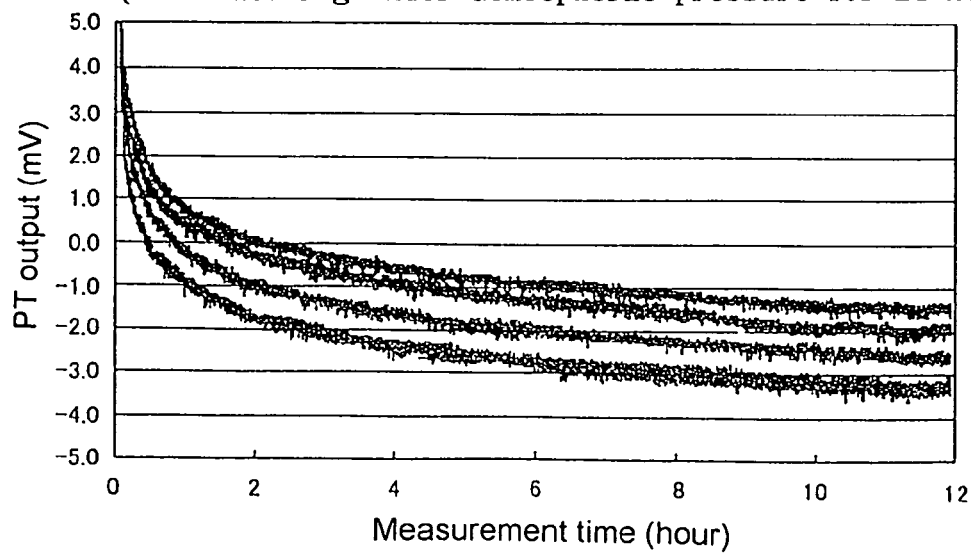
FIG. 3 is a curve to show changes over-time of the zero point output of the pressure sensor used for the present invention while being maintained under vacuum.

FIG. 3 is a diagram to show a state of changes in the zero point of the pressure sensor A in the event that the pressure sensor A is fixed as shown in FIG. 2, and maintained under vacuum (the degree of vacuum $10^{-5} \sim 10^{-6}$ Torr) after leaving it alone for 24 hours under atmospheric pressure.

As apparent from FIG. 3, in approximately one hour immediately after the start of evacuation, zero point changes toward the minus direction by 0.2~0.3% FS (changes are made for 0.2~0.3 Torr when the full scale FS is made to be 100 Torr), and in approximately 5 hours later, it changes further toward the minus direction by 0.1% FS, and then, without it being stabilized, it keeps changing toward the minus direction although the volume of changes is small.

The output of the pressure sensor on the vertical axis in FIG. 3 is expressed by mV, and 2 mV is equivalent to 0.1% FS (that is, 0~100 Torr is equivalent to the output voltage 0~2V).

Figure 4:
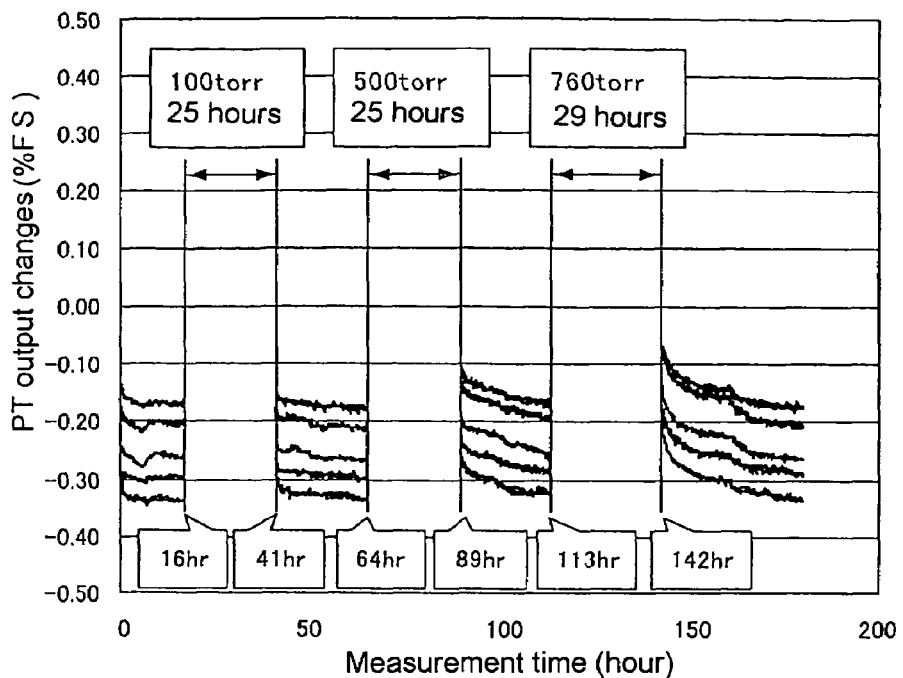
FIG. 4 is a diagram to show "the difference by the service history before the evacuation" of changes over-time of the zero point output of the pressure sensor used for the present invention while being maintained under vacuum.

FIG. 4 shows how pressure·time, which the pressure sensor experiences before evacuation, influences over the stabilization time of the zero point. That is, a test specimen, which is found to be in a state of the zero point being stable to some degree by the vacuum maintenance test, is given experiences in having a couple of different pressure, and stabilization time of the zero point is continuously monitored by maintaining it under vacuum to investigate effects that pressure experienced before evacuation exerted on the stabilization time of the zero point thereafter.

As apparent from FIG. 4, the higher pressure experienced is, the higher the initial value of the zero point is, and the degree of changes toward the minus side after evacuation becomes larger. However, after the lapse of 20~30 hours, it settles down to nearly the same value irrespective of pressure experienced previously. Then, after that, similar to the result of the measurement test on stabilization time of the zero point when left alone in vacuum in FIG. 3, it is assumed that it keeps decreasing at a certain percentage. Time shown by an arrow in the figure is time elapsed from the initial time of the continuous monitoring.

Figure 5:
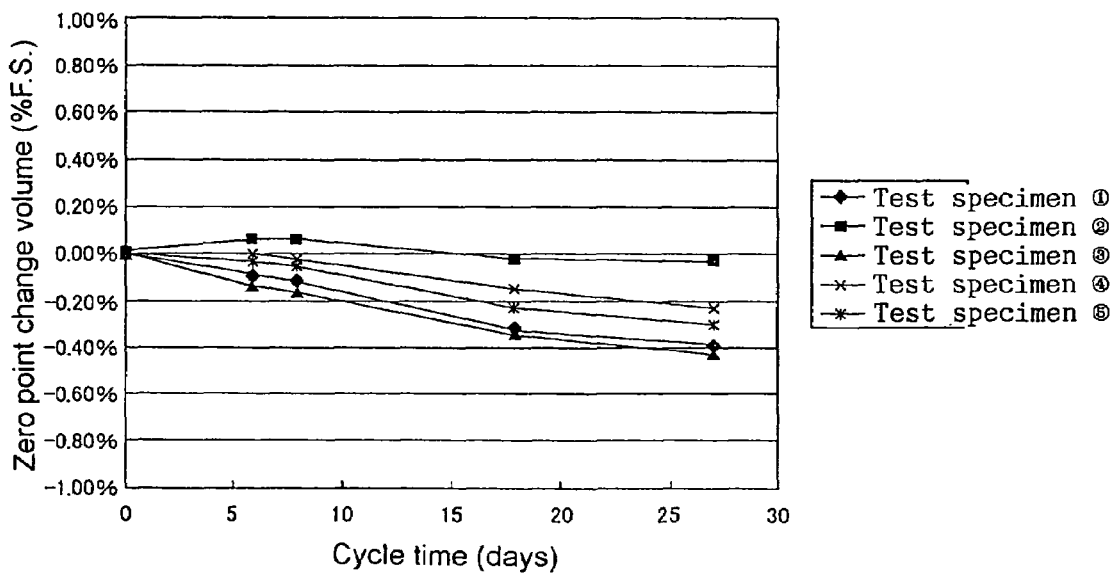
FIG. 5 is a diagram to show changes over-time of the zero point output in the event that pressure of the pressure sensor used for the present invention is made to change at a cycle of 0 (Torr·vacuum)~60 Torr.
Figure 6:
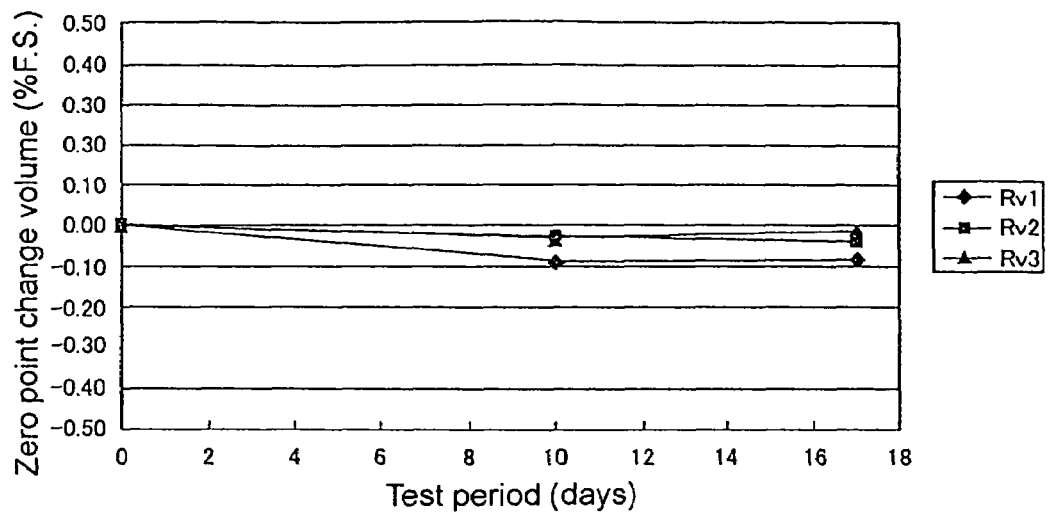
FIG. 6 is a diagram to show changes over-time of the zero point output in the event that pressure of the pressure sensor is made to change at a cycle of 0(Torr·vacuum)~0.1 MpaG.

FIG. 5 and FIG. 6 show the results of measurement wherein the pressure range of 0 Torr (held for 15 seconds and with the vacuum degree of approximately $10^{-6}$ Torr)~60 Torr (held for 30 seconds) is changed with regularity and continuously over 5 hours per day (FIG. 5), and also the pressure range of 0 Torr (held for 15 seconds and with the vacuum degree of approximately $10^{-6}$ Torr)~0.1-1 MPaG (held for 30 seconds) is changed with regularity and continuously over 5 hours per day (FIG. 6), thus finding the changes in the zero point respectively after the lapse of 5 hours. The measurement of the changes in the zero point was conducted over 4 weeks at the interval of approximately one week.

Apparent from FIG. 5, it is found that there occurred some changes in the zero point of 0.2% FS over 1-2 weeks.

With the result in FIG. 6, it is also found that changes in the zero point remain within 0.1% FS toward the minus direction.

Figure 7:
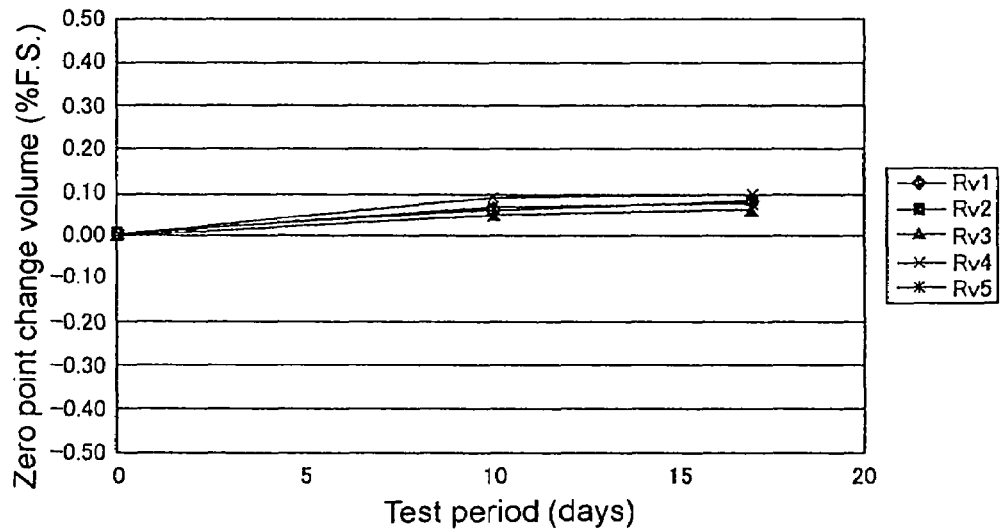
FIG. 7 is a diagram to show changes over-time of the zero point output in the event that pressure of the pressure sensor is maintained at 0.1 MpaG.

FIG. 7 shows the changes over-time in the zero point output in the event that the pressure sensor A is continuously held under pressurization of 0.1 MPaG. It is found that changes in the zero point occurs with the volume of changes less than 0.1% FS toward the plus side.

From the test results shown in FIG. 3 to FIG. 7 inclusive, it is found that there existed the below-stated events on the changes over-time in the zero point output with the pressure sensor A which employs a semiconductor pressure sensitive element (a transducer).

1. With the cycle test of vacuum maintaining, vacuum⇔60 Torr, the zero point keeps changing toward the minus direction.

2. With a vacuum maintained, prominent changes are shown in the initial few hours.

3. Though the percentage of change decreases with the lapse of time, it is found that relatively large changes are seen in the initial stage when it is returned to atmospheric pressure or it is evacuated after it was put in a state of being pressurized to 0.1 MPaG.

4. Unevenness is seen in the vacuum⇔60 Torr cycle test. With some, it is found that the volume of changes is larger than that in the test of vacuum maintaining. After the lapse of one week, it is found that some are out of 0.2% FS.

5. It is assumed that from the results of 0.1 MPaG maintaining test, the zero point does not change with this much maintained pressurization. It is also understood that there are not big changes when it is in a state of atmospheric pressure.

Based on the changes over-time in the zero point output of the pressure sensor A as stated above, inventors of the present invention have created a measure to automatically correct the over-time changes in the zero point not only of the pressure sensor A, but also of the pressure control device and the pressure type flow rate control device which employ the pressure sensor A.

An automatic zero point adjustment device to correct changes over-time in the zero point output of the pressure type flow rate control device according to the present invention is explained hereafter with reference to the drawings.

Figure 8:
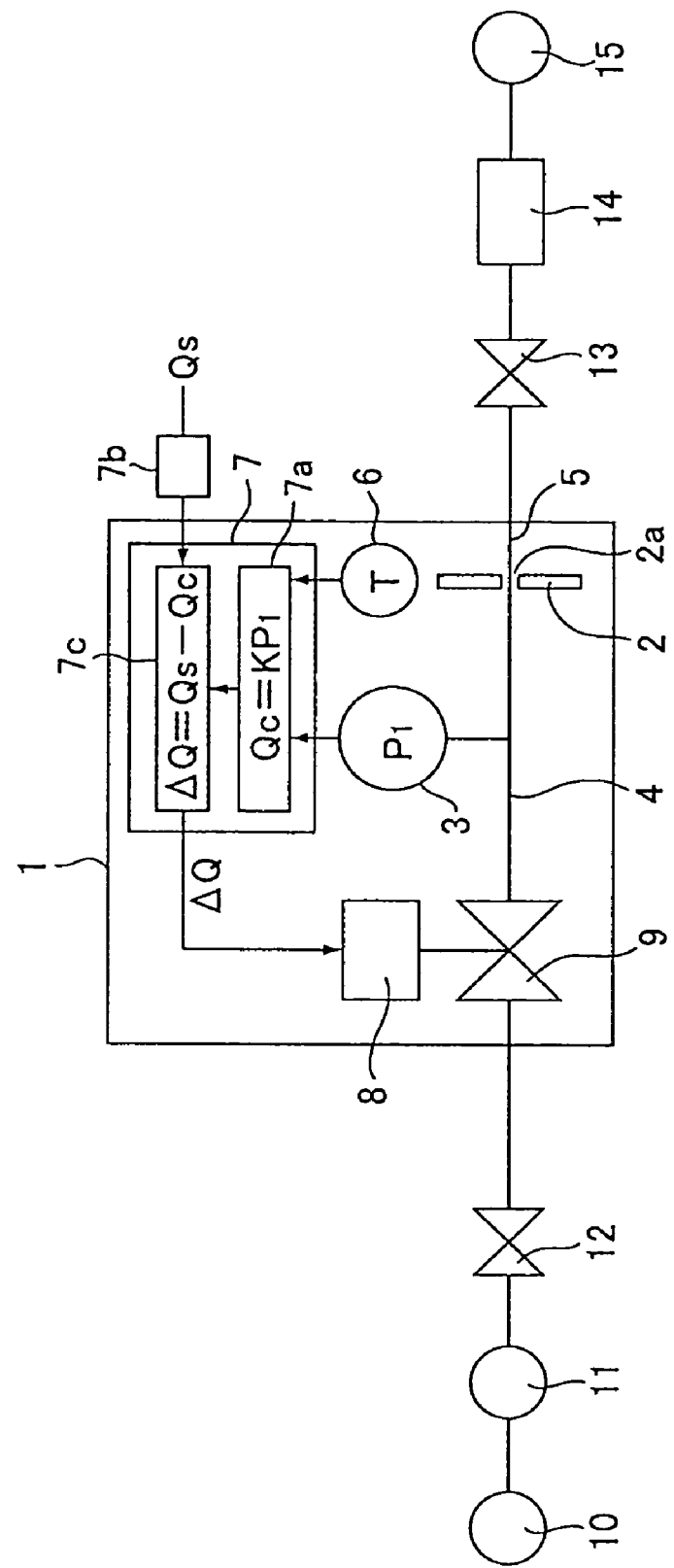
FIG. 8 is a block diagram of the pressure type flow rate control device used for embodiments of the present invention.

FIG. 8 is a block diagram of the pressure type flow rate control device by making use of critical conditions according to the present invention. With the pressure type flow rate control device 1, the flow rate is expressed with $Q=KP_1$ and the measurement of pressure is conducted only by the upstream side pressure sensor 3 due to the reason that it is based on the premise that fluids to be supplied are under critical conditions, that is, the flow velocity of fluids flowed out through the orifice 2 is that of sound. The pressure type flow rate control device 1 is equipped with an orifice 2 which forms an orifice 2a, an upstream side pipe 4, a downstream side pipe 5, an upstream side pressure sensor 3, a temperature sensor 6, a control circuit 7, a valve driving part 8 and a control valve 9.

A control circuit 7, which is constituted centering around an electronic circuit, a micro-computer and a built-in program, comprises an electronic circuit system such as an amplification circuit not illustrated, an A/D converter and the like, a flow rate computing means 7a to compute a flow rate Qc using the experimental flow rate equation, a flow rate setting means 7b to command the set flow rate Qs to flow, and a comparative means 7c to compute the flow rate difference $\Delta Q$ (=Qs−Qc or Qc−Qs) between the flow rate Qc to be computed and the set flow rate Qs.

Referring to FIG. 8, 10 designates a gas supply source, 11 a pressure regulator, 12,13 valves, 14 a process chamber and 15 a vacuum pump.

Pressure $P_2$ on the downstream side from the orifice 2 is set considerably smaller than pressure $P_1$ on the upstream side by evacuation using a vacuum pump, automatically to hold the critical condition of $P_2/P_1$<approximately 0.5 at any time. As a result, the velocity of the gas to flow out through the orifice opening becomes that of sound, and the flow rate Q passing through the orifice 2 is expressed as $Q=KP_1$.

Pressure $P_1$ on the upstream side is measured by the pressure sensor 3. For the accurate measurement of pressure, the sensor part of the pressure sensor 3 is brought into contact with the gas flow. Furthermore, the sensor part is designed to be minimal so that the gas flow can stay out of turbulence. Accordingly, temperature of the sensor part becomes equal to gas temperature T.

Gas temperature T is measured by the temperature sensor 6. Temperature in the proximity of the orifice 2 is measured by the temperature sensor 6 so that the gas flow can stay out of turbulence. When both the gas and the orifice reach a state of equilibrium, thermally, their temperature becomes equal. Therefore, temperature of the orifice can be measured as that of the gas.

Pressure $P_1$ on the upstream side and temperature T of the gas are provided as voltage, and converted to digital signals by the amplification circuit or the A/D converter. The digital signals are inputted to the flow rate computing means 7a, and proportional coefficient K is computed from the gas temperature T and gas properties, and the flow rate Qc to be computed by the equation $Qc=KP_1$ by making use of pressure $P_1$ on the upstream side.

The set flow rate Qs has been inputted from the flow rate setting means 7b, and thus, the flow rate $\Delta Q$ is computed with equation $\Delta Q=Qs-Qc$ by the comparative means 7c.

Computed flow rate difference $\Delta Q$ is outputted to the valve driving part 8, and the degree of opening of the control valve 9 is adjusted to make $\Delta Q$ zero. With the opening adjustment, pressure $P_1$ on the upstream side from the orifice is variably adjusted, thus the flow rate Qc to be computed and obtained with the equation $Qc=KP_1$ being controlled to be equal to the set flow rate.

As stated above, temperature of the sensor part of the pressure sensor 3 is made to be equal to gas temperature T, and temperature of the sensor part of the pressure sensor changes as gas temperature changes. And, the pressure sensor 3 has temperature dependency so that the output voltage of the pressure sensor changes as temperature changes. Accordingly, the pressure type flow rate control device according to the present invention is equipped with a device to correct changes (drift) of the output voltage caused by temperature with the pressure sensor 3 as shown in FIG. 9.

Figure 9:
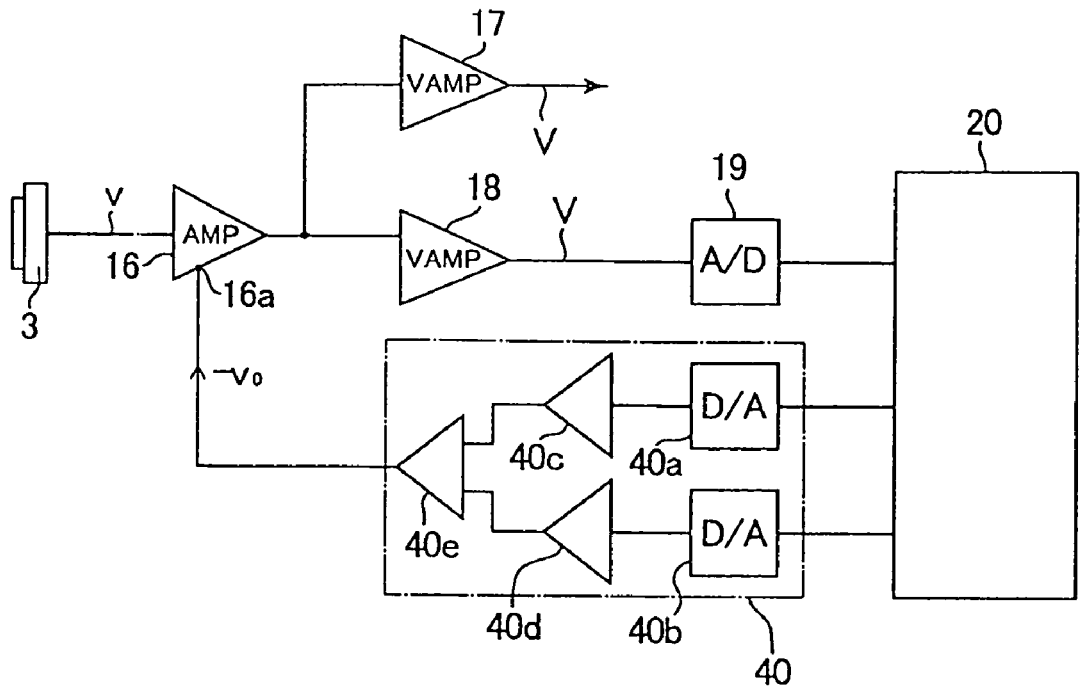
FIG. 9 is a block diagram of the zero point output correction part in the means to correct the output changes of the pressure sensor of the pressure type flow rate control device by temperature used for embodiments of the present invention.

FIG. 9 is a simplified block circuit diagram of the temperature drift correction device to be used for adjustment of the zero point output (that is, output voltage under a state of pressure being zero) in the means to correct changes (drift) of output voltage caused by the afore-mentioned temperature with the pressure type flow rate control device.

Referring to FIG. 9, output voltage V of the pressure sensor 3 is amplified up to pressure voltage V by the fixed amplification circuit 16 and the variable amplification circuit 18. Pressure voltage V is inputted to the CPU 20 through the mediation of the A/D converter 19. Output of the fixed amplification circuit 16 is outputted to the other variable amplification circuit 17, and output of the variable amplification circuit 17, which is output voltage, is displayed on the digital panel as pressure $P_1$ on the upstream side.

Assuming that 100 mV is outputted at the time when the afore-mentioned pressure sensor 3 perceives absolute pressure $P_1$=7 atmospheric pressure (that is, $7 \times 10^2$ kPaA), output voltage V of the pressure sensor 3 becomes output voltage in the range of V=0~42.86 V when pressure $P_1$ on the upstream side is controlled in the range of $P_1$=0~3($\times 10^2$ kPaA) by the pressure sensor.

If the maximum voltage 42.86 mV of output voltage V is amplified to the full scale of 5V, the amplification rate becomes 117 times. With this embodiment, a 117-times amplification rate has been realized by amplifying 100 times with the afore-mentioned fixed amplifier 16 and 1.17 times with the variable amplifiers 17, 18.

Output voltage of the pressure sensor 3 drifts with temperature changes. Output changes (drift) at zero pressure is called a zero point output temperature drift, and output changes (drift) under any given pressure is called an output temperature drift.

The afore-mentioned zero point output temperature drift is corrected by adjusting the offset terminal 16a of the fixed amplifier 16. Specifically, correction of the zero point output drift is realized by the D/A converter for offsetting. That is, when output voltage V indicates a certain value $+v_0$ at the time of pressure zero, $-v_0$ is inputted to the offset terminal 16a, to make the zero point output drift voltage zero. As a result, changes (drift) in the zero point output have been corrected as effective input voltage becomes $v_0+(-v_0)=0$ even when output voltage $v_0$ is inputted to the fixed amplifier 16 at pressure zero.

The afore-mentioned D/A converter for offsetting comprises a D/A converter 40a for coarse adjustment and a buffer 40c, a D/A converter 40b for fine adjustment and a buffer 40d, and a buffer 40e for synthesis. As explained as follows, the zero point output drift is corrected by canceling the zero point output drift by means of applying the zero point correction voltage $-v_0$, for which the zero point output drift voltage $v_0$ is reversed, to the offset terminal 16a by the circuit for coarse adjustment and the circuit for fine adjustment.

Figure 10:
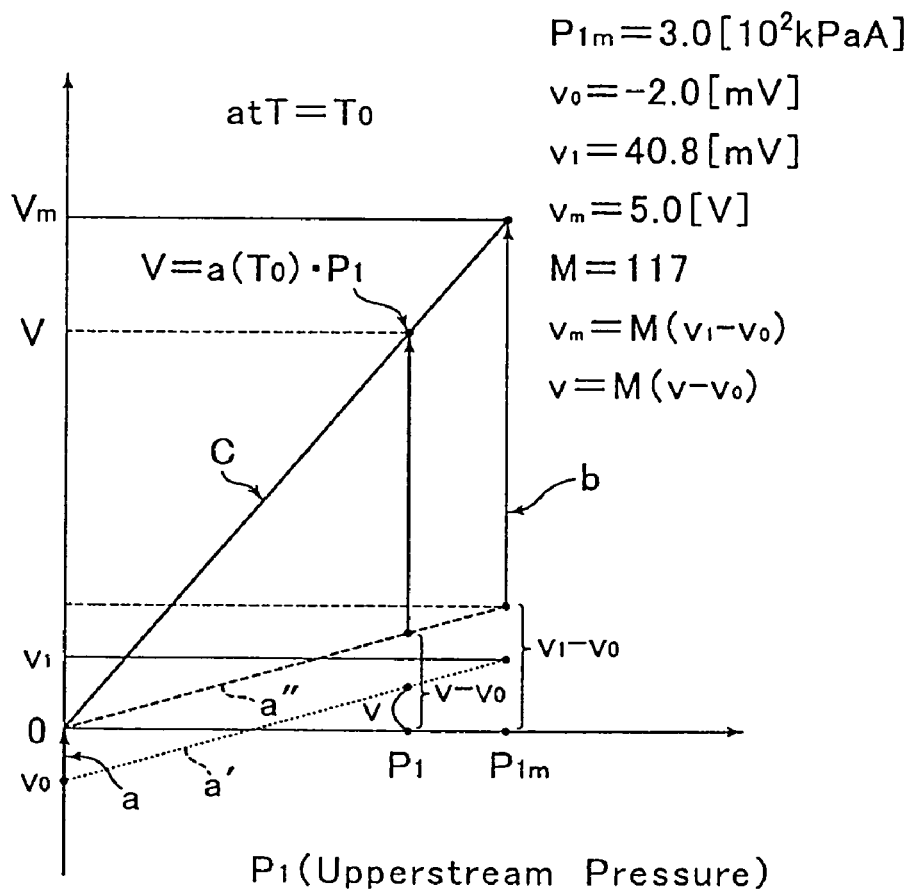
FIG. 10 is an explanatory drawing to show the relationship between the correction of the zero point output voltage and the full scale (FS) of the pressure sensor.

FIG. 10 is an explanatory drawing to show the relationship between the correction of changes (drift) in the zero point output voltage and the setting of the full scale FS. Pressure $P_1$ on the upstream side is shown on the lateral axis, and output voltage v of the pressure sensor 3 and pressure voltage V of the variable amplifier 18 is shown on the vertical axis. The pressure range is made to be $P_1=0\sim P_{1m}$, and the maximum pressure is made to be $P_{1m}=3.0(\times 10^2$ kPaA). Now, when gas temperature T is $T_0$, the maximum output voltage of the sensor is $v_1=40.8$ mV at the zero point drift of $v_0=-2.0$ mV and the maximum pressure $P_{1m}$.

Thus, a dotted line a' connecting $v_0$ and $v_1$ in FIG. 10 shows the temperature characteristics of the pressure sensor 3. Here, when $-v_0$ is applied to the offset terminal 16a, $v_0$ becomes 0 mV with the equation $v_0+(-v_0)=0$, thus making the correction from $v_0$ to zero (an arrow a). As the result, the sensor output voltage at the maximum pressure $P_{1m}$ also becomes $v_0+(-v_0)$ =40.8+2.0=42.8 mV. Accordingly, the output of the pressure sensor 3 is corrected to 0~42.8 mV with the zero point drift correction. The temperature characteristics after the correction is shown by the dashed line a".

Next, the full scale setting of the pressure sensor 3 is performed. When the output of the pressure sensor after the zero point adjustment is $0\sim v_1+(-v_0)$, that is, 0~43.8 mV, it is set to the full scale 5V. That is, to amplify 42.8 mV to 5V, the amplification rate of the variable amplifiers 44, 46 is made to be 1.17. As the result, the 2-step amplification rate is set at $M=100\times 1.17=117$. This correction is shown by the arrow 6.

Accordingly, the maximum voltage $V_m$ becomes $V_m=(v1-v_0)$, and the output voltage v of the pressure sensor 3 at any given pressure $P_1$ is amplified to $V=M(v-v_0)$. The solid line C represents the amplified output V. For the critical condition, $V=a(T_0)P_1$ is represented by the solid line C. The proportional constant $a(T_0)$ shows the proportional constant when gas temperature T is $T_0$.

With the explanation on the afore-shown FIG. 9 and FIG. 10, it is known that the zero point output drift of $v_0=-2.0$ mV is caused by temperature changes of fluids (gases). Accordingly, it is understood that the straight line a' represents the temperature characteristics of the output v of the pressure sensor, and the straight line C represents the temperature characteristics of the output V of the amplifier.

On the other hand, with the present invention, the issue is the zero point correction of the over-time changes of the output v of the pressure sensor. Therefore, by defining that the zero point output drift $v_0$ in the afore-shown FIG. 9 and FIG. 10 (that is, the output $v_0$ of the output sensor at pressure zero) is the zero point output drift caused by the changes over-time, the correction means explained on FIG. 9 and FIG. 10 previously and its relation with the setting of the full scale (FS) become applicable, as it is, to the correction of the zero point output drift cause by the changes over-time.

That is, it is understood that the straight line a' with the afore-shown FIG. 10 is the time-varying characteristics of the output v of the pressure sensor, and that the straight line C is the time-varying characteristics of the output V of the amplifier.

Detailed explanation on how to measure the over-time output change characteristics of the output v of the pressure sensor 3 illustrated in the afore-shown FIG. 3 to FIG. 6 inclusive is omitted herewith. The lapse of time and the volume of changes (drift voltage $v_0$) of the zero point output of the pressure sensor 3 are measured by making the pressure inside the pipe B, wherein the pressure sensor 3 is assembled in the shape as shown in FIG. 2, pressure zero (vacuum $10^{-5}\sim 10^{-6}$ Torr), that is, $P_1\approx =0(\times 10^{-2}$ kPaA) by use of a vacuum pump (not illustrated), or the lapse of time and the volume of changes $v_0$ of the zero point output of the pressure sensor 3 are measured under a state of the pressure inside the pipe B being held at any given set value.

The afore-shown FIG. 3 is a characteristic diagram of time-varying output which illustrates one example of the zero point output drift by the time changes of the pressure sensor 3 when maintained under vacuum. Time (Hr) is shown on the lateral axis, while voltage $v_0$ of the zero point output drift is shown on the vertical axis. The output voltage 2 mV of the sensor is equivalent to 0.1% of the full scale at the time when the full scale is made to be 100 Torr. The line of the PT output 0 mV shows an ideal situation having no drift. The curve represents the zero point output drift actually measured. The drift differs depending on samples of the pressure sensor. However, as stated above, it will be approximately 0.2~0.3% FS ($v_0=4\sim 6$ mV) after approximately 1 hour, and approximately 0.4% FS ($v_0=8$ mV) after approximately 6 hours, and the zero point output drift voltage $v_0$ is applied to the offset terminal 16a of the fixed amplification circuit 16 in the afore-shown FIG. 9.

With the present invention, it is made in such a manner that when the time-varying zero point output drift $v_0$ of the pressure sensor 3 becomes larger than −0.13% FS (that is, the zero point output drift $v_0$ of −2.6 mV), an automatic zero point adjustment of the pressure sensor 3 is performed by applying the zero point output drift $v_0$ to the offset terminal 16a of the fixed amplification circuit 16 shown in FIG. 9.

The reasons why the afore-mentioned −0.13% FS is made to be an adjusting reference point for the time-varying zero point drift are that, after the result of the basic tests shown in FIG. 3 to FIG. 6 and others, it has been learned that the zero point drift $v_0$ can occur only toward the minus direction when maintained under vacuum, and also that the zero point drift of the order of −0/13% FS ($v_0=-2.6$ mV) is within practical tolerance of the pressure sensor 3.

Specifically, first, a judgment is made to see whether or not the output voltage v of the pressure sensor 3 is on the minus side.

It should be noted that gas pressure has always been applied to the pressure sensor 3 while a pressure control device is in use. This means that there is no chance that the output voltage v of the pressure sensor 3 is on the minus side. Accordingly, when it is judged that the output voltage v of the pressure sensor 3 is on the minus side, it is known that the pressure control device is not in use, and that no gas is running.

When maintained under vacuum, it is certain that the time-varying zero point output voltage drift of the pressure sensor 3 is always on the minus side. Therefore, it is understood that the pressure sensor 3 is maintained under vacuum or near-vacuum (of the order of $10^{-2}\sim10^{-6}$ Torr) if the output drift v of the pressure sensor 3 is found on the minus side.

Accordingly, by judging that the output voltage drift v of the pressure sensor 3 is on the minus side, the adjustment of the time-varying zero point drift can be performed anytime because it tells that the pressure type flow rate control device is in a state of no use, and the pressure inside the pipe is maintained in near-vacuum.

Next, a judgment is made to find if the output voltage drift v of the pressure sensor 3 exceeds the afore-mentioned set value (v=−0.13% FS) or not. And, in case that it is found that the output drift v of the pressure sensor exceeds the set value, the adjustment of the zero point drift $v_0$ is automatically performed with the self-test wherein it is judged that the adjustment of the time-varying zero point drift of the pressure sensor 3 is required.

Figure 11:
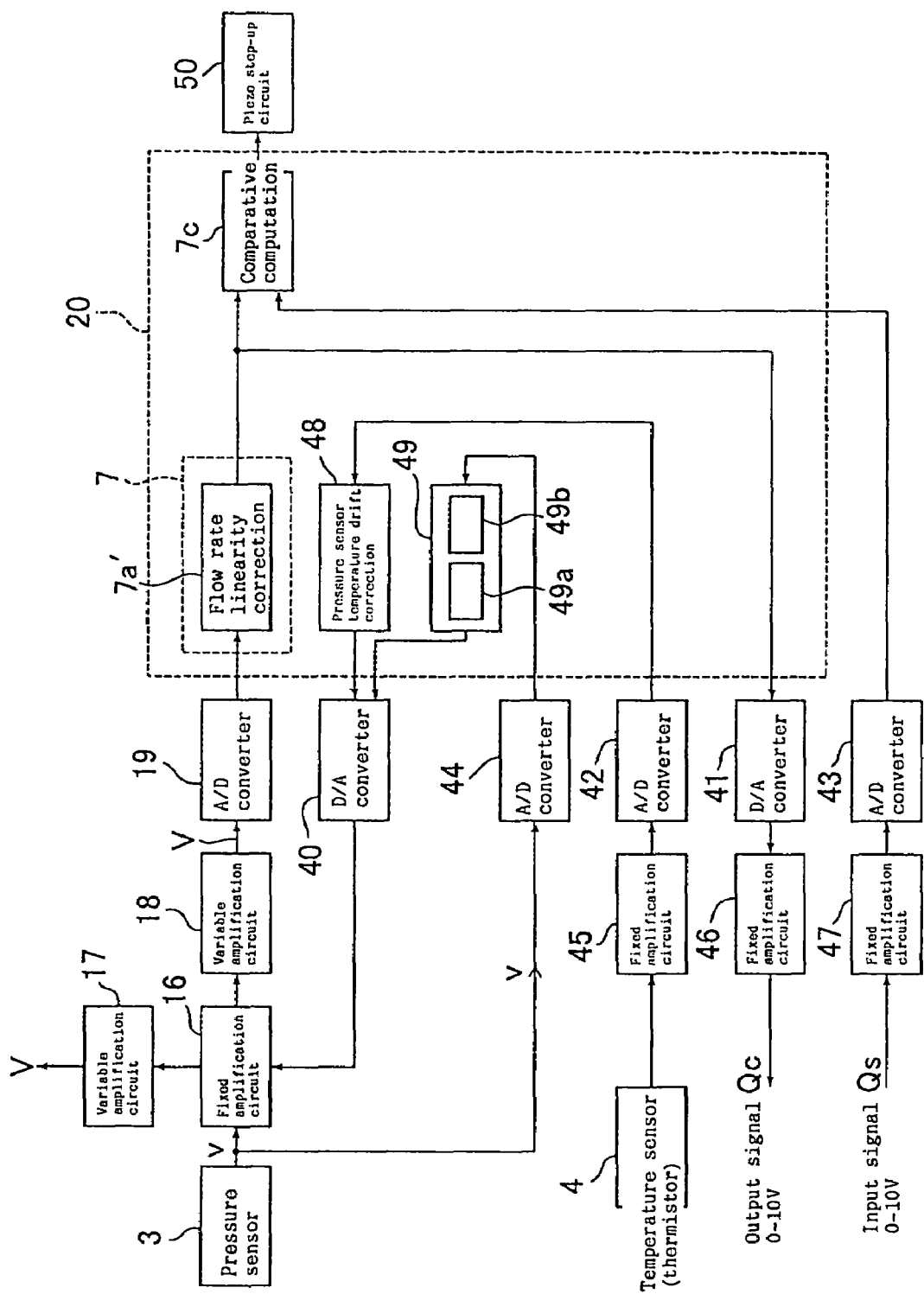
FIG. 11 is a block diagram of the control circuit of the pressure type flow rate control device pertaining to the present invention.

FIG. 11 is a detailed block diagram of the control circuit of the pressure control device. The explanation is omitted herewith because a pressure sensor 3, a fixed amplifier 16, variable amplifiers 17, 18, an A/D converter 19, a D/A converter 4 for offsetting, and the like are the same as those shown in FIG. 9.

The control circuit of the pressure type flow rate control device is also nearly the same as that in FIG. 11. The only difference from FIG. 11 is that the gas temperature part (not illustrated) is mounted on the output side of the flow rate linearity correction part 7a' in the flow rate computing means, and the temperature detection signal from the temperature sensor 4 is inputted to the gas temperature correction part.

With FIG. 11, 41 designates a D/A converter, 42, 43, 44 A/D converters, 7 a control circuit, 7a a comparative circuit, 20 a CPU, 7a' a flow rate linearity correction part in the flow rate computing means, 48 a temperature drift correction means of the pressure sensor, 49 a time-varying zero point drift correction means of the pressure sensor, and 50 a piezo-step-up circuit. The control valve (not illustrated) is controlled for opening and closing with the output from the piezo-step-up circuit 50.

The time-varying zero point drift correction means 49 of the pressure sensor is equipped with a means to judge if the input value v from the A/D converter 44 exceeds the set value (−0.13% FS=−2.6 mV) (a sensor output judgment means 49a), and an operating condition judgment means 49b to judge either if the input for forced closing to a control valve 9 is set or if the pressure setting signal V is less than 0.6% FS. When one of the following occurs, that is, (1) if input for forced opening of the control valve 9 is set, (2) if input for forced closing of the control valve 9 is set, or (3) if the pressure setting signal V is less than 0.6% FS (V=60 mV·sensor output voltage v=12 mV) is confirmed, and also when it is confirmed that output v of the pressure sensor 3 is more than −0.13% FS by the sensor output judgment means 49a, then voltage for the zero point adjustment ($v_0$=2.6 mV), which is equivalent to +0.13% FS, is automatically inputted to the offset terminal 16a of the fixed amplification circuit 16 from the D/A converter, thus performing the automatic zero point adjustment by the drift output (−2.6 mV) equivalent to the time-varying zero point drift (−0.13% FS) of the pressure sensor being canceled therewith.

Figure 12:
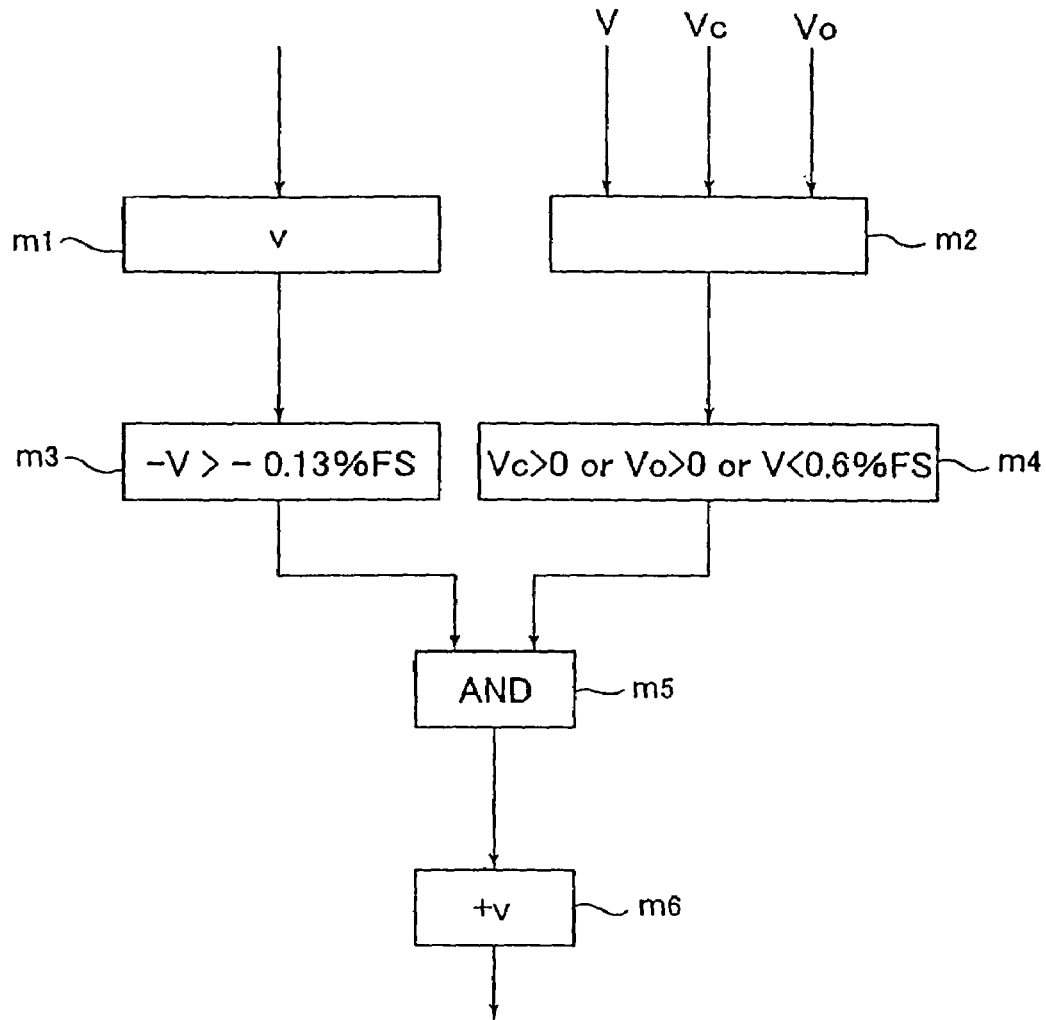
FIG. 12 is an operating flow diagram of the time-varying zero-point drift correction means of the pressure sensor pertaining to the present invention.
Figure 13:
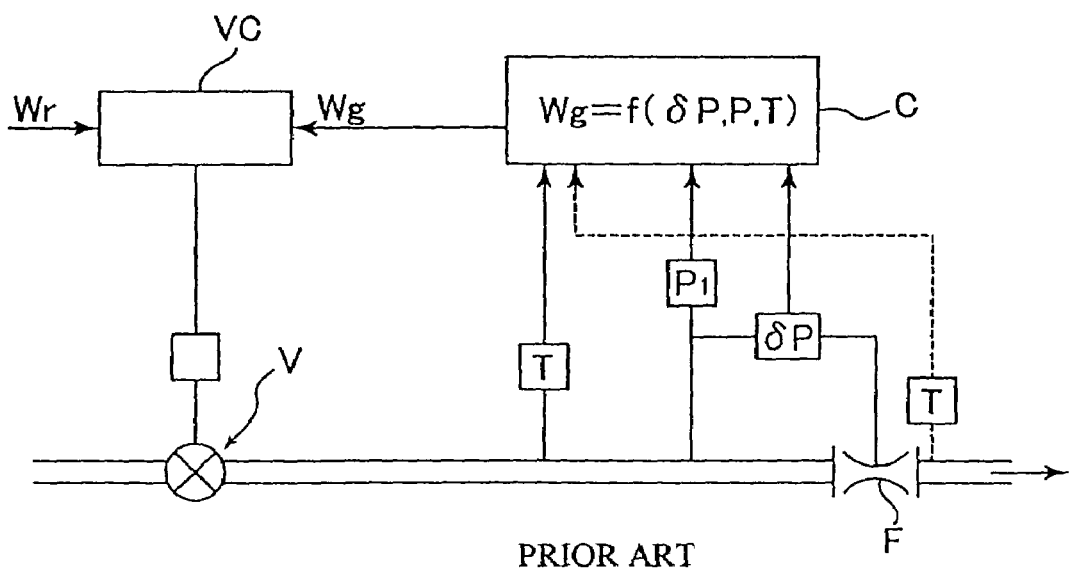
FIG. 13 shows one example of a conventional pressure type flow rate control device.
Figure 14:
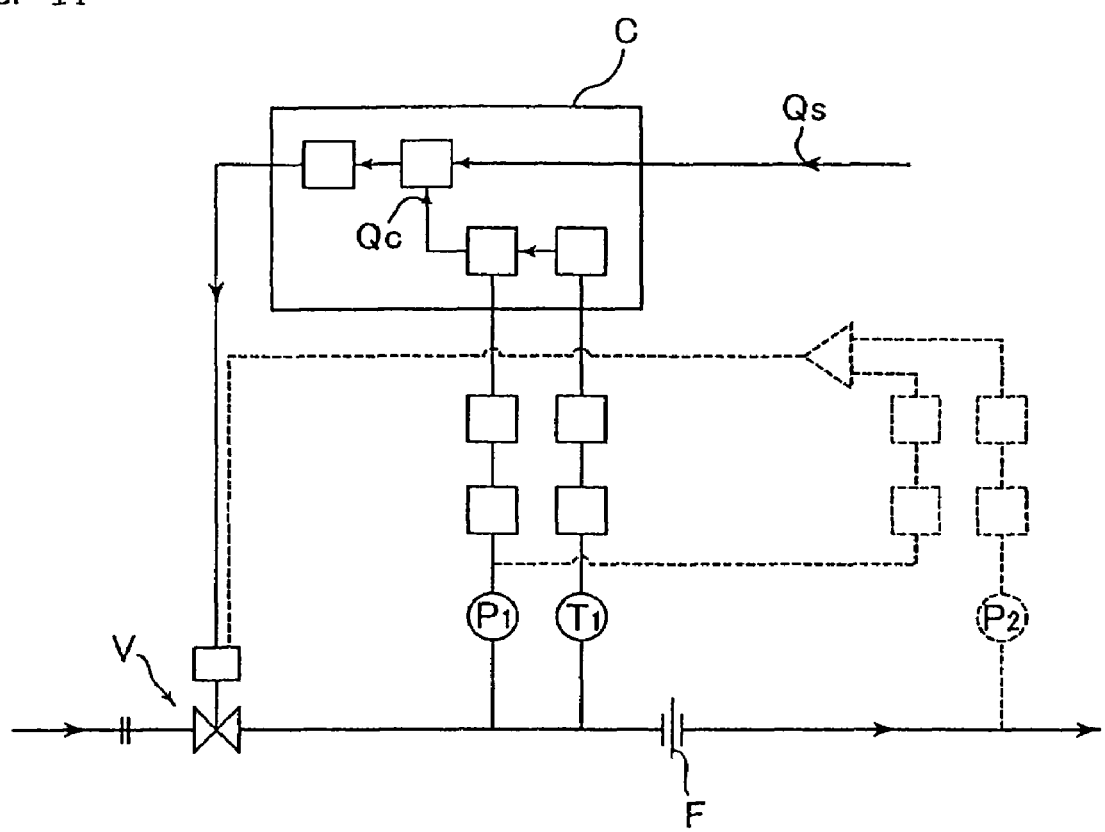
FIG. 14 shows another example of a conventional pressure type flow rate control device.

FIG. 12 is an operating flow diagram of the time-varying zero point drift correction means 49 of the pressure sensor according to the present invention. With the step $m_1$, output voltage v from the pressure sensor 3 is inputted. With the step $m_2$, the input signal $V_c$ for forced opening, or the input signal Vo for forced closing, is inputted to the control valve 9. With the step $m_3$, a judgment is made to determine if the afore-mentioned v exceeds −0.13% FS (v=−2.6 mV) or not. With the step $m_4$, a judgment is made to determine if Vc or Vo exists, and also if the pressure setting signal V is less than 0.6% FS.

Lastly, with the step $m_5$, when v exceeds −12 mV and either one of the conditions Vc>0 or $V_0$>0, or V<0.6% FS is satisfied (step $m_5$), then output voltage of +v(=2.6 mV) is outputted to the offset terminal 16a of the fixed amplification circuit 16 with the step $m_6$.

With the embodiment according to the present invention illustrated in the afore-shown FIG. 1 to FIG. 11 inclusive, the present invention was explained based on the pressure type flow rate control device to be used under critical conditions. However, there is no need to say that the present invention can be applied to the pressure control device to be used under non-critical conditions or the pressure sensor to be used singly.

FEASIBILITY OF THE INDUSTRIAL USE

The present invention is mainly used for semiconductor manufacturing facilities or chemical products manufacturing facilities. The present invention is also widely used in the fields where the high degree of accuracy is required to control the flow rate or the supply pressure of fluids such as raw gases.

The invention claimed is:

1. An automatic zero point correction device, comprising:
   a pressure sensor operable to measure fluid pressure, wherein output voltage from the pressure sensor is outputted to an outside and the sensor output voltage is inputted to a time-varying zero point drift correction means of the pressure sensor;
   a sensor output judgment means of the time-varying zero point drift correction means, wherein the sensor output judgment means operates to make a judgment to determine whether the sensor output voltage is larger than a set value; and
   operating condition judgment means of the time-varying zero point drift correction means, wherein the operating condition judgment means judges operating conditions of the pressure sensor, wherein the time-varying zero point drift correction means operates to cancel time-varying zero point drift of the pressure sensor when the sensor output judgment means determines that the sensor output voltage is larger than the set value and the operating condition judgment means determines that the operating conditions of the pressure sensor are within previously set operating conditions.

2. An automatic zero point correction device as claimed in claim 1, wherein the pressure sensor is a semiconductor pressure sensitive element, the output voltage from the pressure sensor is outputted to the outside through an amplifier and is inputted to the time-varying zero point drift correction means of the pressure sensor through an A/D converter, and output for zero point correction is inputted to an offset terminal of the amplifier from the time-varying zero point drift correction means through a D/A converter when the sensor output voltage is larger than the set value and the pressure sensor is operating under the set operating conditions, wherein the output for zero correction is identical to the sensor output voltage with reversed polarity.

3. An automatic zero point correction device, comprising:
   a pressure control device equipped with a control valve for pressure control and a pressure sensor operable to measure fluid pressure, wherein output voltage from the pressure sensor is outputted to an outside and the sensor output voltage is inputted to a time-varying zero point drift correction means of the pressure sensor;

a sensor output judgment means of the time-varying zero point drift correction means, wherein the sensor output judgment means operates to make a judgment to determine whether the sensor output voltage is larger than a set value; and operating condition judgment means of the time-varying zero point drift correction means, wherein the operating condition judgment means judges operating conditions of the pressure sensor, wherein the time-varying zero point drift correction means operates to cancel time-varying zero point drift of the pressure sensor when the sensor output judgment means determines that the sensor output voltage is larger than the set value and the operating condition judgment means determines that the operating conditions of the pressure sensor are within previously set operating conditions.

4. An automatic zero point correction device as claimed in claim 3, wherein the set value used as a reference at the sensor output judgment means of the time-varying zero point drift correction means is employed as the sensor output voltage equivalent to less than control accuracy of the full scale pressure to be detected by the pressure sensor.

5. An automatic zero point correction device as claimed in claim 3, wherein the set operating conditions used as a reference at the operating condition judgment means of the time-varying zero point drift correction means comprise three conditions including
   i. whether or not a signal for forced opening to the control valve exists;
   ii. whether or not a signal for forced closing to the control valve exists; and
   iii. the set signal for flow rate is zero.

6. An automatic zero point correction device as claimed in claim 3, wherein the pressure sensor is a semiconductor pressure sensitive element, the output voltage from the pressure sensor is outputted to the outside through an amplifier and is inputted to the time-varying zero point drift correction means of the pressure sensor through an A/D converter, and output for zero point correction is inputted to an offset terminal of the amplifier from the time-varying zero point drift correction means through a D/A converter when the sensor output voltage is larger than the set value and the pressure sensor is operating under the set operating conditions, wherein the output for zero point correction is identical to the sensor output voltage with reversed polarity.

7. An automatic zero point correction device as claimed in claim 6, wherein the D/A converter, through which voltage for the zero point correction is outputted to the offset terminal of the amplifier from the time-varying zero point correction means, is shared with a temperature drift correction means of the pressure sensor mounted on a flow rate computing means of the pressure type flow rate control device.

8. An automatic zero point correction device as claimed in claim 6, wherein the set value used as a reference at the sensor output judgment means of the time-varying zero point drift correction means is employed as the sensor output voltage equivalent to less than control accuracy of the full scale pressure to be detected by the pressure sensor.

9. An automatic zero point correction device as claimed in claim 6, wherein the set operating conditions used as a reference at the operating condition judgment means of the time-varying zero point drift correction means comprise three conditions including
   i. whether or not a signal for forced opening to the control valve exists;
   ii. whether or not a signal for forced closing to the control valve exists; and
   iii. the set signal for the flow rate is zero.

10. An automatic zero point correction device, comprising:
    a pressure type flow rate control device comprising an orifice for flow rate control, a control valve mounted on the upstream side pipe from the orifice, and an upstream side pressure sensor installed between the orifice and the control valve to detect upstream side pressure P1 to control flow rate of fluid passing through the orifice by the upstream side pressure P1, wherein output voltage from the pressure sensor is outputted to a flow rate computing means;
    a time-varying zero point drift correction means of the pressure sensor, wherein the sensor output voltage is inputted to the time-varying zero point drift correction means;
    a sensor output judgment means of the time-varying zero point drift correction means, wherein the sensor output judgment means operates to make a judgment to determine whether the sensor output voltage is larger than a set value; and
    operating condition judgment means of the time-varying zero point drift correction means, wherein the operating condition judgment means judges operating conditions of the pressure sensor, wherein the time-varying zero point drift correction means operates to cancel time-varying zero point drift of the pressure sensor when the sensor output judgment means determines that the sensor output voltage is larger than the set value and the operating condition judgment means determines that operating conditions of the pressure sensor are within previously set operating conditions.

11. An automatic zero point correction device as claimed in claim 10, wherein the set value used as a reference at the sensor output judgment means of the time-varying zero point drift correction means is employed as the sensor output voltage equivalent to less than control accuracy of the full scale pressure to be detected by the pressure sensor.

12. An automatic zero point correction device as claimed in claim 10, wherein the set operating conditions used as a reference at the operating condition judgment means of the pressure sensor comprise three conditions including
    i. whether or not a signal to forced opening to the control valve exists;
    ii. whether or not a signal to forced closing to the control valve exists; and
    iii. the set value of the flow rate is zero.

13. An automatic zero point correction device as claimed in claim 10, wherein the pressure sensor is a semiconductor pressure sensitive element, the output voltage from the pressure sensor is outputted to the outside through an amplifier and inputted to the time-varying zero point drift correction means of the pressure sensor through an A/D converter, and output for zero point correction is inputted to an offset terminal of the amplifier from the time-varying zero point drift correction means through a D/A converter when the sensor output voltage is larger than the set value and the pressure sensor is operating under the set operating conditions, wherein the output for zero correction is identical to the sensor output voltage with reversed polarity.

14. An automatic zero point correction device as claimed in claim 13, wherein the D/A converter, through which voltage for the zero point correction is outputted to the offset terminal of the amplifier from the time-varying zero point drift correction means, is shared with a temperature drift correction means of the pressure sensor mounted on a flow rate computing means of the pressure type flow rate control device.

15. An automatic zero point correction device, comprising:

a pressure type flow rate control device comprising an orifice for flow rate control, a control valve mounted on the upstream side pipe from the orifice, an upstream side pressure sensor installed between the orifice and the control valve to detect upstream side pressure P1, and a downstream side pressure sensor mounted on the downstream side pipe to detect downstream side pressure P2 to control the flow rate of fluid passing through the orifice by both upstream side pressure P1 and downstream side pressure P2, wherein the output voltage from the upstream side pressure sensor is outputted to a flow rate computing means;

a time-varying zero point drift correction means of the upstream side pressure sensor, wherein the sensor output voltage from the upstream side pressure sensor is inputted to the time-varying zero point drift correction means;

a sensor output judgment means of the time-varying zero point drift correction means, wherein the sensor output judgment means operates to make a judgment to determine whether the sensor output voltage from the upstream side pressure sensor is larger than a set value; and operating condition judgment means of the time-varying zero point drift correction means, wherein the operating condition judgment means judges operating conditions of the upstream side pressure sensor, wherein the time-varying zero point drift correction means operates to cancel time-varying zero point drift of the upstream side pressure sensor when the sensor output judgment means determines that the sensor output voltage of the upstream side pressure sensor is larger than the set value and the operating condition judgment means determines that operating conditions of the upstream side pressure sensor are within previously set operating conditions.

16. An automatic zero point correction device as claimed in claim 15, wherein the upstream side pressure sensor is a semiconductor pressure sensitive element, the output voltage from the upstream side pressure sensor is outputted to the outside through an amplifier and is inputted to the time-varying zero point drift correction means of the upstream side pressure sensor through an A/D converter, and output for zero point correction is inputted to an offset terminal of the amplifier from the time-varying zero point drift correction means through a D/A converter when the sensor output voltage of the upstream side pressure sensor is larger than the set value and the upstream side pressure sensor is operating under the set operating conditions, wherein the output for zero correction is identical to the sensor output voltage of the upstream side pressure sensor with reversed polarity.

17. An automatic zero point correction device as claimed in claim 16, wherein the D/A converter, through which voltage for the zero point correction is outputted to the offset terminal of the amplifier from the time-varying zero point drift correction means, is shared with a temperature drift correction means of the pressure sensor mounted on a flow rate computing means of the pressure type flow rate control device.

* * * * *